US012245041B2

(12) United States Patent
Linn et al.

(10) Patent No.: US 12,245,041 B2
(45) Date of Patent: *Mar. 4, 2025

(54) DYNAMIC KEYBOARD FOR ELECTRONIC COMPUTING DEVICE

(71) Applicant: Wells Fargo Bank, N.A., San Francisco, CA (US)

(72) Inventors: Graham Linn, Oakland, CA (US); Marjorie Summit Anzalone, San Francisco, CA (US); Andriy Fedorchuk, San Francisco, CA (US); Robert Glenn Hamchuk, San Jose, CA (US); Jason Huang, San Francisco, CA (US); Dennis E. Montenegro, Concord, CA (US); Matthew Pearce, Pacifica, CA (US); Ramanathan Ramanathan, Bellevue, WA (US); Rajiv Ranjan, Fremont, CA (US); Debarchana Roy, San Francisco, CA (US); Adam Benjamin Smith-Kipnis, Seattle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/411,298

(22) Filed: Jan. 12, 2024

(65) Prior Publication Data

US 2024/0155351 A1 May 9, 2024

Related U.S. Application Data

(63) Continuation of application No. 17/096,159, filed on Nov. 12, 2020, now Pat. No. 11,910,196.

(51) Int. Cl.
*H04W 12/00* (2021.01)
*G06F 3/01* (2006.01)
(Continued)

(52) U.S. Cl.
CPC ............ *H04W 12/68* (2021.01); *G06F 3/017* (2013.01); *G06F 21/316* (2013.01);
(Continued)

(58) Field of Classification Search
CPC ...... H04W 12/68; G06F 3/017; G06F 21/316; G06F 21/32; H04L 9/3226
See application file for complete search history.

(56) References Cited

U.S. PATENT DOCUMENTS 8,994,657 B2   3/2015   Liberty et al.
9,984,219 B2   5/2018   Chaar et al.
(Continued)

FOREIGN PATENT DOCUMENTS

CN         109744994 A  *  5/2019

OTHER PUBLICATIONS

Goel et al., "WalkType: Using Accelerometer Data to Accommodate Situational Impairments in Mobile Touch Screen Text Entry", CHI 2012, May 5-10, 2012, Austin, Texas, USA. pp. 2687-2696.

*Primary Examiner* — Khai M Nguyen
(74) *Attorney, Agent, or Firm* — Merchant & Gould P.C.

(57) ABSTRACT

A method of authenticating a passcode entered by a user on an unstable electronic computing device. The method includes receiving an indication that an input is unstable, impacting the ability of a user to provide the input; generating a dynamic keyboard including at least one alphanumeric key, the dynamic keyboard being configured to address the unstable input; presenting the dynamic keyboard to the user; receiving the input from the user, the input comprising a selection of at least one alphanumeric character of a passcode on the dynamic keyboard; and authenticating the input received from the user by comparing the at least one alphanumeric character and a stored passcode.

20 Claims, 12 Drawing Sheets

(51) Int. Cl.
  *G06F 21/31*   (2013.01)
  *H04L 9/32*    (2006.01)
  *H04W 12/68*   (2021.01)
  *G06F 21/32*   (2013.01)

(52) U.S. Cl.
  CPC ............ *H04L 9/3226* (2013.01); *G06F 21/32* (2013.01); *H04L 2209/805* (2013.01)

(56) References Cited

U.S. PATENT DOCUMENTS

| | | | | |
|---|---|---|---|---|
| 10,113,546 | B2* | 10/2018 | Klimes | F04C 15/0026 |
| 10,429,935 | B2* | 10/2019 | Hall | G06F 3/017 |
| 10,699,116 | B2* | 6/2020 | Azam | G06V 40/19 |
| 11,496,458 | B1* | 11/2022 | Anand | H04L 67/141 |
| 11,740,787 | B2* | 8/2023 | McIntosh | G06F 3/0488 |
| | | | | 715/773 |
| 11,910,196 | B1* | 2/2024 | Linn | G06F 3/011 |
| 2009/0320123 | A1 | 12/2009 | Yu et al. | |
| 2010/0115583 | A1* | 5/2010 | Delia | H04L 63/083 |
| | | | | 726/2 |
| 2017/0279957 | A1* | 9/2017 | Abramson et al. | G06F 21/36 |
| 2019/0384898 | A1* | 12/2019 | Chen | G06F 21/36 |
| 2020/0019250 | A1 | 1/2020 | Mlmaz et al. | |

\* cited by examiner

DYNAMIC KEYBOARD FOR ELECTRONIC COMPUTING DEVICE

BACKGROUND

Electronic computing devices often require input of passwords and passcodes. For instance, an electronic computing device typically includes the ability to lock the device when not in use and can only be unlocked by a user who enters the correct passcode. If a user fails to enter the correct passcode, the electronic computing device remains locked.

In some situations, an external factor, such as the environment in which the electronic computing device is being used, causes the electronic computing device to be unstable. In other situations, the user is unstable, for example, a user who has a muscle tremor. These unstable conditions can make it difficult for the user to input the correct passcode.

SUMMARY

Embodiments of the disclosure are directed to providing a dynamic keyboard to a user, the dynamic keyboard being configured to address an instability. The instability may be caused from a variety of reasons, such as an unstable external environment or instability of a user, making it difficult to accurately select an input on a standard keyboard.

In a first aspect, a method of authenticating a passcode entered by a user on an unstable electronic computing device is described. The method includes receiving an indication that an input is unstable, impacting an ability of a user to provide the input; generating a dynamic keyboard including at least one alphanumeric key, the dynamic keyboard being configured to address the unstable input; presenting the dynamic keyboard to a user; receiving the input from a user, the input comprising a selection of at least one alphanumeric character of a passcode on the dynamic keyboard; and authenticating the input received from the user by comparing the at least one alphanumeric character and a stored passcode.

In another aspect, an electronic computing device comprising at least one processor and a system memory is described. The system memory includes instructions, which, when executed by the processor, cause the electronic device to perform the following: receive an indication that an input is unstable; impacting the ability of a user to provide the input; generate a dynamic keyboard including at least one alphanumeric key, the dynamic keyboard being configured to address the unstable input; present the dynamic keyboard to a user; receive the input from a user, the input comprising a selection of at least one alphanumeric character of a passcode on the dynamic keyboard; and authenticate the input received from the user by comparing the at least one alphanumeric character and a stored passcode.

In yet another aspect, a method of determining a keyboard type to display on an electronic computing device is described. The method includes receiving a motion reading from an input stability indicator of an electronic computing device; comparing the motion reading with a predetermined motion threshold value; when the motion reading is below the predetermined threshold value, displaying a standard keyboard; and when the motion reading is at or above the predetermined threshold value, displaying a dynamic keyboard, the dynamic keyboard being configured to address an instable input.

The details of one or more techniques are set forth in the accompanying drawings and the description below. Other features, objects, and advantages of these techniques will be apparent from the description, drawings, and claims.

DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
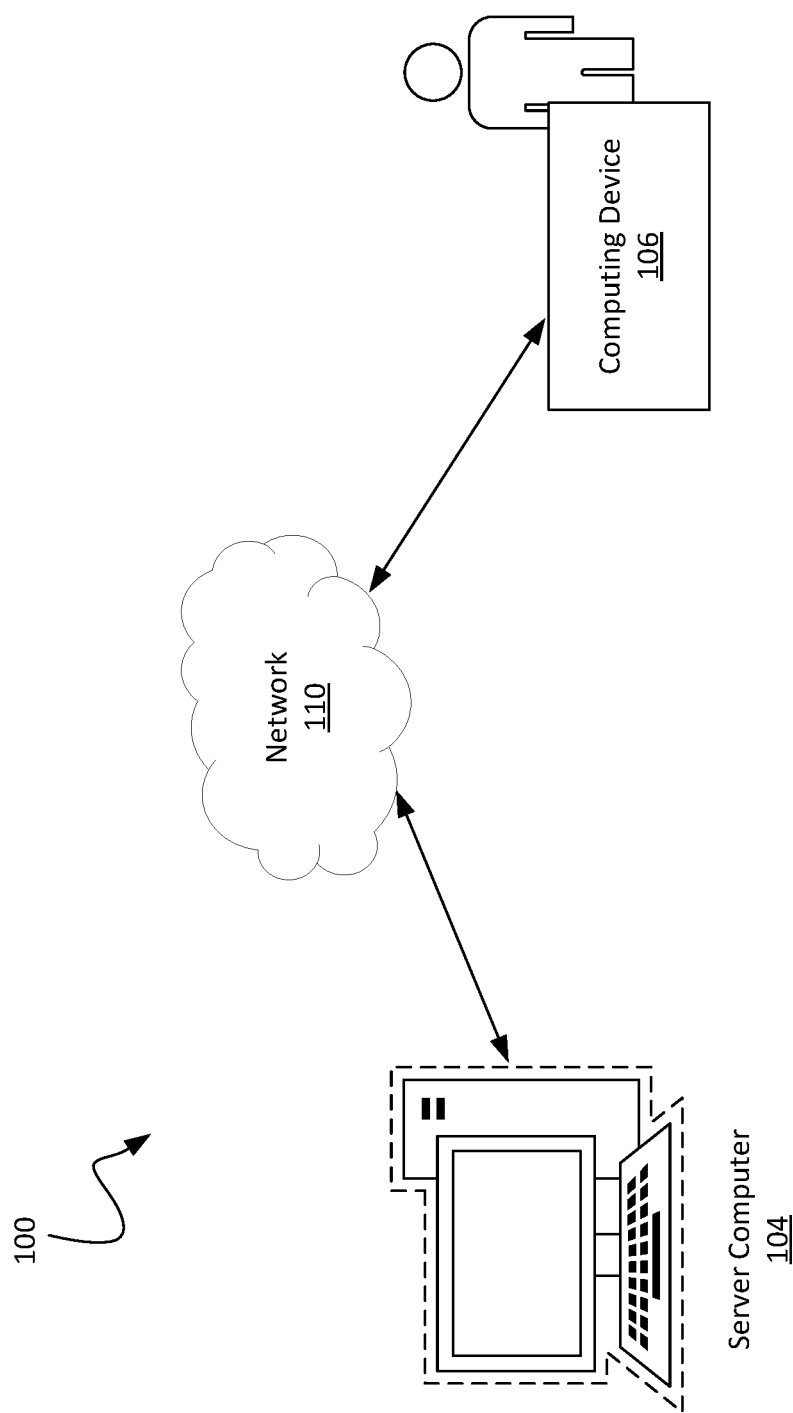
FIG. 1 illustrates an example environment that supports the use of an electronic computing device.

Various embodiments will be described in detail with reference to the drawings, wherein like reference numerals represent like parts and assemblies through the several views. Reference to various embodiments does not limit the scope of the claims attached hereto. Additionally, any examples set forth in this specification are not intended to be limiting and merely set forth the many possible embodiments for the appended claims.

Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," and "including" are interchangeable and not intended to be limiting. The term "such as" also is not intended to be limiting. For example, the term "including" shall mean "including, but not limited to."

The examples set forth herein are directed towards providing a dynamic, or alternative, keyboard on an electronic computing device. A dynamic keyboard is useful when the user is experiencing unstable conditions that may impair their ability to correctly select an input on the electronic computing device. Unstable conditions may include conditions specific to the user, such as a user who has a tremor or other muscle shake, or external conditions, such as being in a moving vehicle.

Unstable conditions can be verified by components of the electronic computing device, such as a gyroscope, a camera, or a global positioning sensor (GPS), which is described in more detail below. In other embodiments, a dynamic keyboard may always be presented to the user who has a muscle shake. In such an embodiment, a user shaking profile may be created and saved.

A dynamic keyboard can be provided based on the current instability of the user and/or the electronic computing device. The dynamic keyboard can be a simplified keyboard, with a plurality of selectable alphanumeric keys and at least one disabled alphanumeric key (e.g., greyed out, or not greyed out but still unable to receive input). In another example, some alphanumeric keys can appear larger than others. In another embodiment of a dynamic keyboard, alphanumeric keys can be presented to the user and the user is prompted to provide input of what direction the next input is from the presented alphanumeric character (e.g., is the next number up, down, left, or right of the presented alphanumeric character). Other configurations are possible, as described herein.

As the user enters a passcode, a dynamic keyboard can zoom in and out so that the correct alphanumeric character, but also some of the incorrect alphanumeric character, are displayed and in an easier form to select. The user can be prompted to enter a correct alphanumeric character if an incorrect alphanumeric character is pressed (i.e., allow the user to correct what they just inputted).

FIG. 1 illustrates an example environment 100 that supports the use of an electronic computing device 106 that provides a dynamic keyboard. The environment 100 includes the electronic computing device 106, a server computer 104, and a network 110.

In an example, the server computer 104 is an electronic computing device of a company, wherein access requires authentication of a user. The company might be a financial institution, such as a bank, and the user is requesting access to his or her financial accounts associated with the bank. Although a single server is shown, multiple servers can be provided, such as in cloud computing and/or a server farm.

The electronic computing device 106 is a user device, such as a phone or other mobile device, including a wearable device. The electronic computing device 106 is capable of communicating with the network 110 and the server computer 104, if needed. Although a single electronic computing device is shown, multiple (e.g., hundreds, thousands, millions of) electronic computing devices can be connected to the server computer 104.

The electronic computing device 106 can include a motion sensor, such as an accelerometer, gyroscope, and/or a magnetometer. The motion sensor is configured to measure tilt, shake, rotation, and swing of the electronic computing device 106. The electronic computing device 106 can also include a global positioning sensor (GPS) and a haptic sensor. The haptic sensor can detect forces, vibrations, or motions of the user with respect to a sense of touch.

The electronic computing device 106 may be a wearable device comprising augmented reality (AR) or virtual reality (VR) capabilities. An AR device can be a stand-alone device or an electronic computing device such as a smartphone or tablet computer that includes an augmented reality software application. The stand-alone AR device can comprise a headset, similar to eyeglasses, which may be worn by the user. One example of an AR headset is Google Glass®, from Google Inc. of Mountain View, CA. Another example of an AR headset is Microsoft HoloLens®, from Microsoft Corporation of Redmond, WA. More than one AR device can be used.

The headset can include a wearable computer, a camera, and an optical display. The wearable computing device includes a wireless telecommunication capability, permitting a wireless connection between the wearable computing device and one or more server computers. The wearable computer also includes voice recognition capability, permitting the user to direct the wearable computer via voice commands. In addition, in some implementations, the wearable computer also includes biometric capability such as facial recognition, retinal scan capability, fingerprint, and voice print capability.

An example VR device is an electronic computing device that supports virtual reality. Virtual reality is a computer technology that uses images, sounds, and other sensations to replicate a real environment or an imaginary setting, and simulates a user's physical presence in this environment to enable the user to interact with the replicated environment. The VR device can comprise a head-mounted display, such as goggles with an eye-viewable screen, that can provide a view of the replicated environment and that can permit interaction with the replicated environment. An example VR device is Oculus Rift®, from Oculus VR, LLC of Irvine, CA. More than one VR device can be used.

An example AR device is an electronic computing device that supports augmented reality. An example of an AR device that may be carried by the user is a smart telephone or tablet computer that includes AR components such as a processor, display and camera, and an AR software application.

The example network 110 is a computer network and can be any type of wireless network, wired network, and cellular network, including the Internet. The electronic computing device 106 can communicate with the server computer 104 via the network 110.

Figure 2:
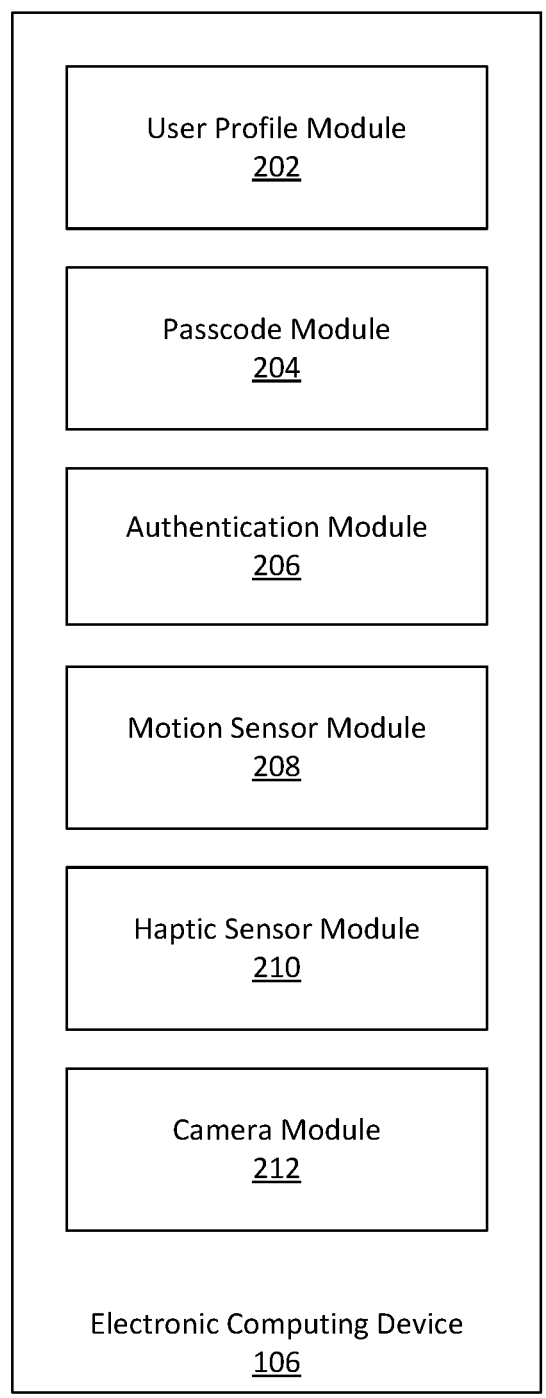
FIG. 2 illustrates a block diagram of components of the electronic computing device of FIG. 1.

FIG. 2 illustrates a block diagram of components of the electronic computing device 106, which includes a user profile module 202, a passcode module 204, an authentication module 206, a motion sensor module 208, a haptic sensor module 210, and a camera module 212.

The user profile module 202 stores information regarding a user, such as a user shaking profile. This can be created based on a user's typical shakiness or unsteadiness when inputting an input, such as a passcode. The user profile module 202 can be used to calculate a confidence level when a user is entering a passcode. If a passcode is entered incorrectly, the confidence level can determine when to request the user re-enter an input associated with the passcode. For example, if a user enters a "5," when "4" is the correct answer, the user can be requested to re-enter the input because "5" is close to "4" on a keyboard.

The passcode module 204 stores the correct passcode of the electronic computing device 106 and is used to authenticate an input received by comparing the selected alphanumeric characters with the stored passcode.

The motion sensor module 208 receives information from an accelerometer, a gyroscope, and/or a magnetometer and determines if the electronic computing device 106 is unstable. The motion sensor module 208 can receive information such as a tilt, a shake, a rotation, and a swing of the electronic computing device 106. When the motion sensor module 208 determines that the electronic computing device 106 is unstable, a dynamic keyboard can be presented to the user.

The haptic sensor module 210 receives information from the haptic sensors of the electronic computing device 106 to determine if the input received is unstable. When the haptic sensor module 210 determines that the electronic computing device 106 is unstable, a dynamic keyboard can be presented to the user.

The camera module 212 receives information from a camera, such as a user's eye gaze. In an example, the eye gaze can be used to determine if the input received was the intention of the user. If the user inputs a "5," but their eye gaze was directed at the "4," than it may be determined that the user selected the wrong number input. In an example, the user may be requested to re-enter the input.

Figure 3:
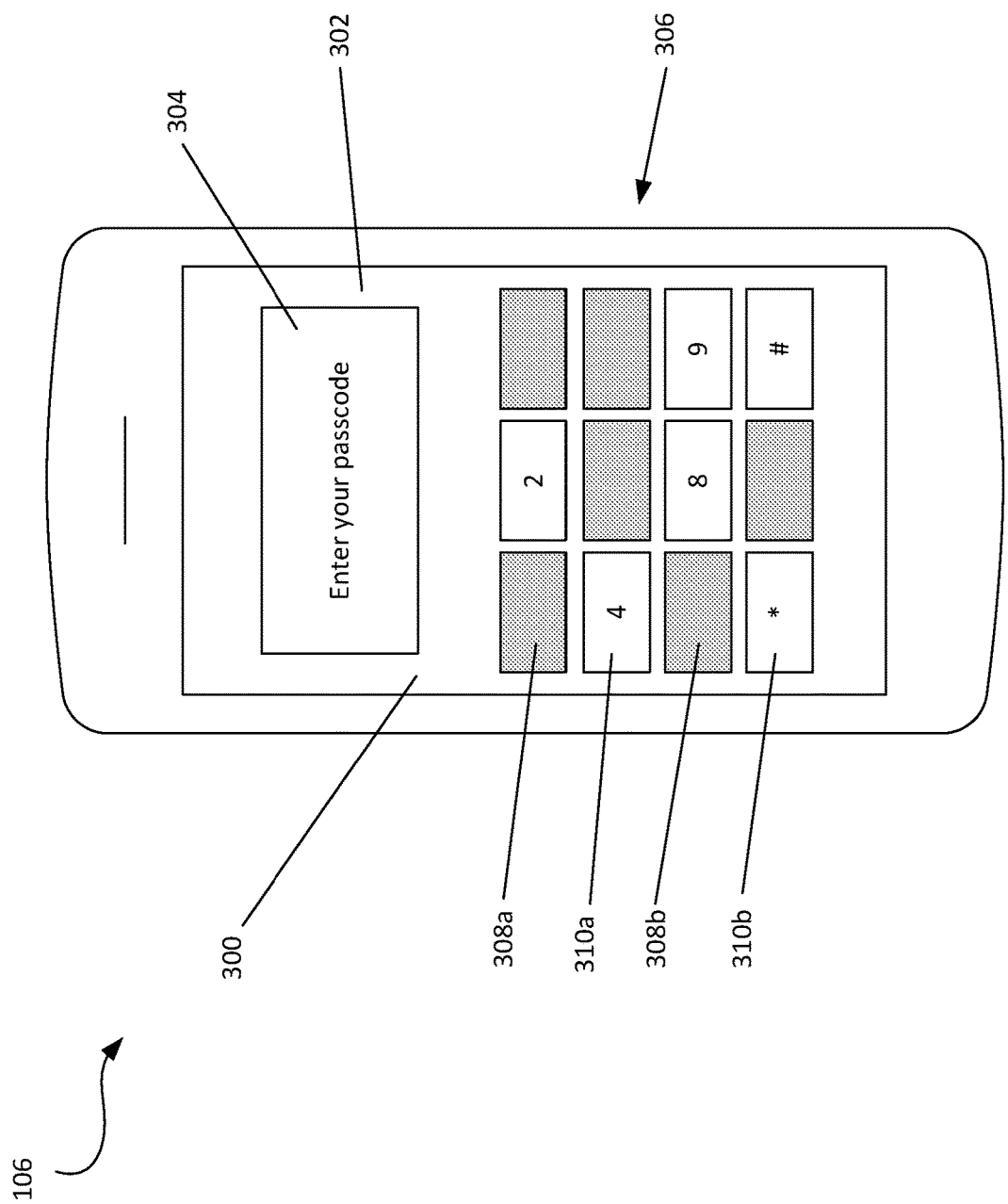
FIG. 3 illustrates an example of a dynamic keyboard on the user interface of the electronic computing device of FIG. 2.

FIG. 3 illustrates an example of a dynamic keyboard 306 on a user interface 300 of the electronic computing device 106. In the example shown, a mobile device displays a request 304 for a user to enter their passcode in order to unlock the mobile device. The dynamic keyboard 306 includes a plurality of standard alphanumeric character keys 310a, 310b and a plurality of greyed-out alphanumeric character keys 308a, 308b (or otherwise disabled keys). This simplifies passcode entry for a user by only presenting a predetermined number of selectable keys at a single time.

In a first example, the dynamic keyboard 306 may display the same standard alphanumeric character keys 310a, 310b and the same greyed-out alphanumeric character keys 308a, 308b throughout the entire entry of the passcode. In another example, the dynamic keyboard 306 may display different standard alphanumeric character keys 310a, 310b and different greyed-out alphanumeric character keys 308a, 308b throughout the entry of the passcode.

Still further, while entry of a passcode is used as an example described throughout, entries of other types are contemplated. The methods described herein may be useful when a user is entering any type of entry on their electronic computing device 106, such as a passcode entry for an application or other secure log-in.

While the embodiment shown includes only a numerical keyboard, an alphabetical keyboard may also be used. Further, the keyboard may include a combination of letters and numbers, as well as symbols. The examples described herein are not to be seen as limiting, for example, when a numerical keyboard is described, an alphabetical or combination keyboard may also be used.

Figure 4:
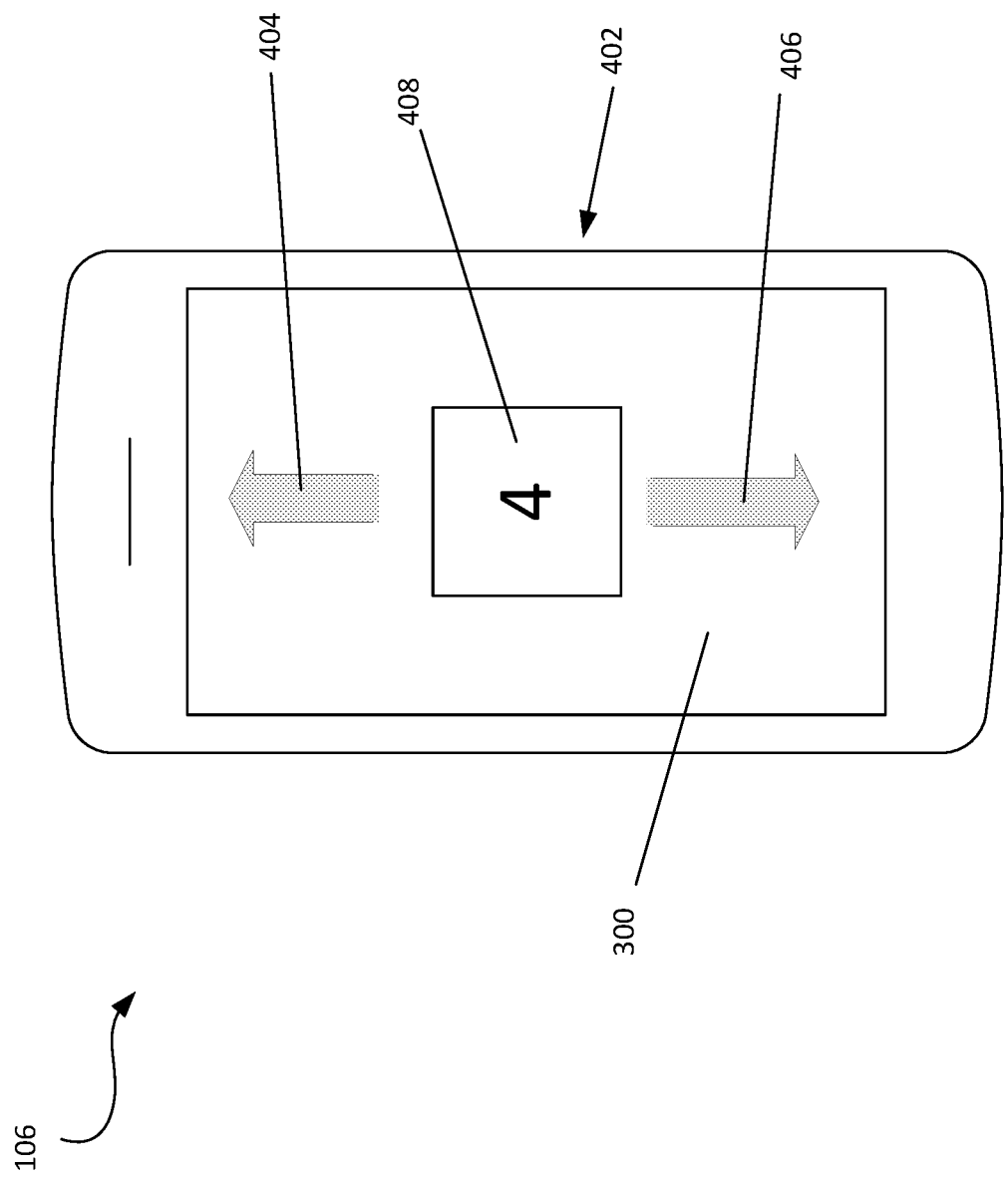
FIG. 4 illustrates another example dynamic keyboard on the electronic computing device of FIG. 2.

FIG. 4 illustrates another example dynamic keyboard 402 on the electronic computing device 106. The user interface 300 includes a scrollable alphanumeric character 408 and two selectable arrows 404, 406. The scrollable alphanumeric character 408 can be changed by selecting either one of the arrows 404, 406. When a user selects the first arrow 404 on the user interface 300, the scrollable alphanumeric character 408 changes in value. For example, selecting the first arrow 404 increases the value of the scrollable alphanumeric character 408, while selecting the second arrow 406 decreases the value of the scrollable alphanumeric character 408. When the desired alphanumeric character is shown on the user interface 300, a user can select the alphanumeric character by selecting it itself.

The dynamic keyboard 402 may also be used in another method. In the alternative method, a user selects one of the two selectable arrows 404, 406 as an input relative to the scrollable alphanumeric character 408. For example, the scrollable alphanumeric character 408 displays a "4." If the desired input is "5," the user selects the top arrow 404, while if the desired input is "3," the user selects the bottom arrow 406. After a user has selected the desired arrow 404, 406, the alphanumeric character of the scrollable alphanumeric character 408 changes.

Figure 5:
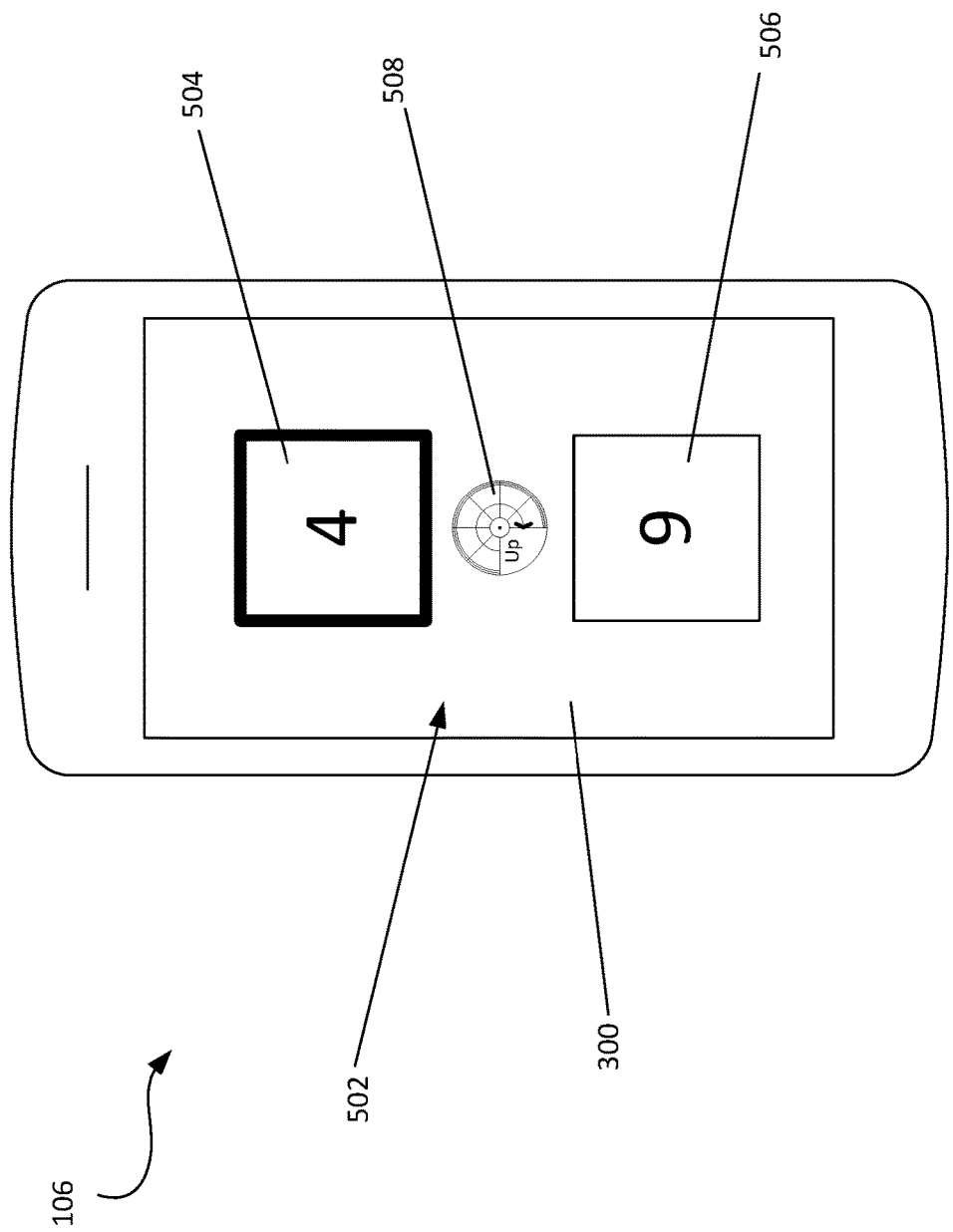
FIG. 5 illustrates an alternative example dynamic keyboard on a user interface of the electronic computing device of FIG. 2.

FIG. 5 illustrates an alternative example dynamic keyboard 502 on the user interface 300 of the electronic computing device 106. The user interface 300 includes a first selectable alphanumeric character 504 and a second selectable alphanumeric character 506. The user interface 300 also includes an optional slider button 508.

The first selectable alphanumeric character 504 and the second selectable alphanumeric character 506 display different alphanumeric characters at the same time. One of the selectable alphanumeric characters 504, 506 is the desired alphanumeric character, while the other selectable alphanumeric character 504, 506 is randomly generated. After each input by the user, the displayed selectable alphanumeric characters 504, 506 change. Although only two selectable alphanumeric characters 504, 506 are displayed, any number of selectable alphanumeric characters may be displayed on the user interface 300.

In an example method of use, a user desires to enter their passcode. A user selects a first alphanumeric character by selecting the selectable alphanumeric character 504 itself on the user interface 300, and then the displayed selectable alphanumeric characters 504, 506 change. The user then selects a subsequent selectable alphanumeric character 504, 506, and again the displayed selectable alphanumeric characters 504, 506 change. This process is repeated until the user has selected all the alphanumeric characters of their passcode.

In an alternative example method of use, a user desires to enter their passcode. The user selects one of the selectable alphanumeric characters 504, 506 using the slider button 508. Selecting the slider button 508 on the user interface 300 changes the highlighted selectable alphanumeric character 504, 506. As shown, the top selectable alphanumeric character 504 is highlighted, which then selects that selectable alphanumeric character 504. Alternatively, the slider button 508 may allow the selectability of one of the selectable alphanumeric characters 504, 506 by a sliding motion. A user can select the slider button 508 and swipe up or down to select the desired selectable alphanumeric character 504, 506.

Figure 6:
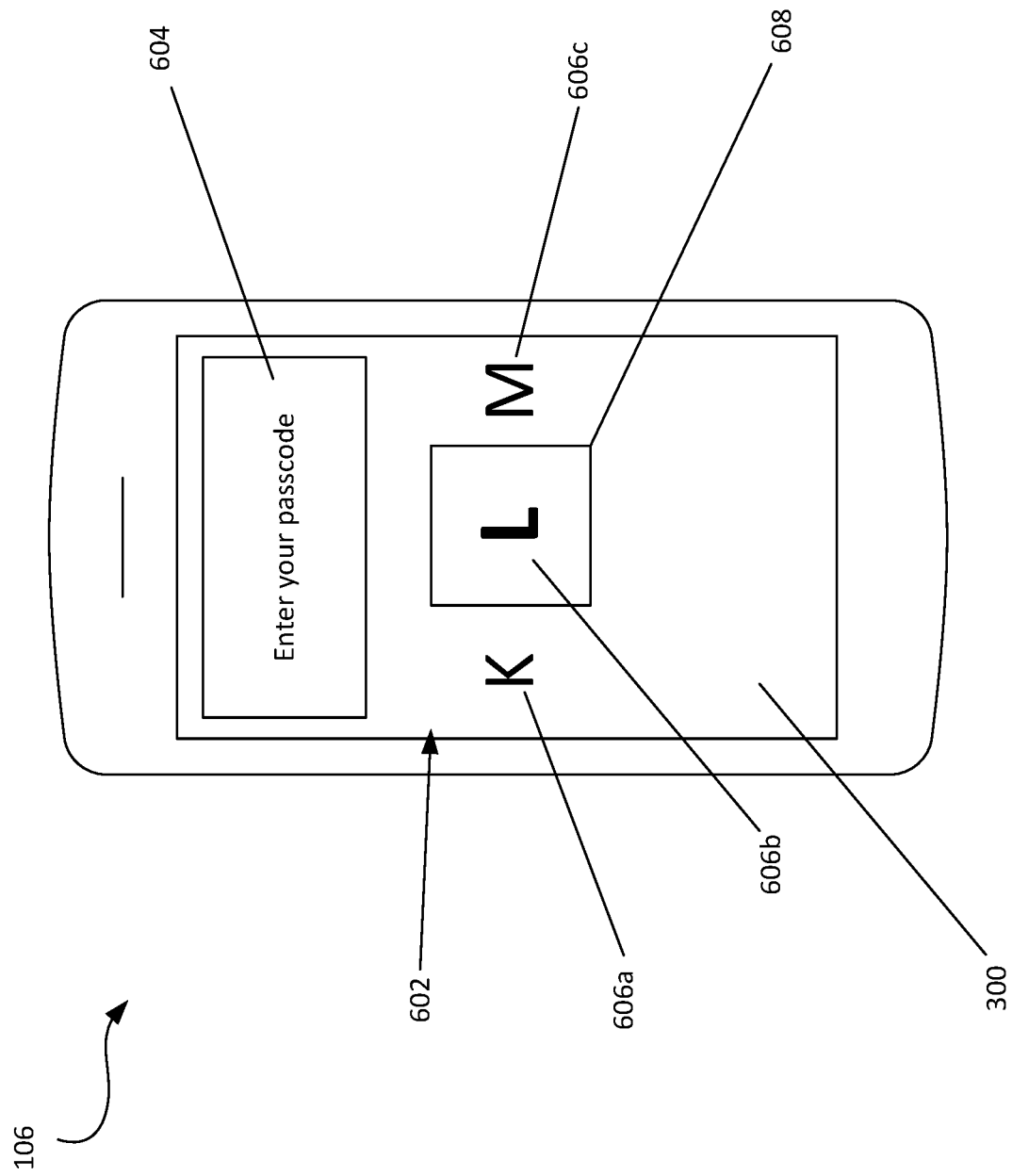
FIG. 6 illustrates another example embodiment of a user interface of the electronic computing device of FIG. 2 with a dynamic keyboard.

FIG. 6 illustrates another example embodiment of the user interface 300 with a dynamic keyboard 602. The user interface 300 includes a message 604 indicating that the electronic computing device 106 needs a passcode entered. A dynamic keyboard 602 includes a selectable alphanumeric character 608 and a plurality of other alphanumeric characters 606a, 606b, 606c.

In an example method of use, a user swipes left or right on the user interface 300 on the plurality of alphanumeric characters 606a, 606b, 606c until the desired alphanumeric character is located at the selectable alphanumeric character 608. Once the desired alphanumeric character is located at the selectable alphanumeric character 608, a user can enter the desired letter.

Figure 7:
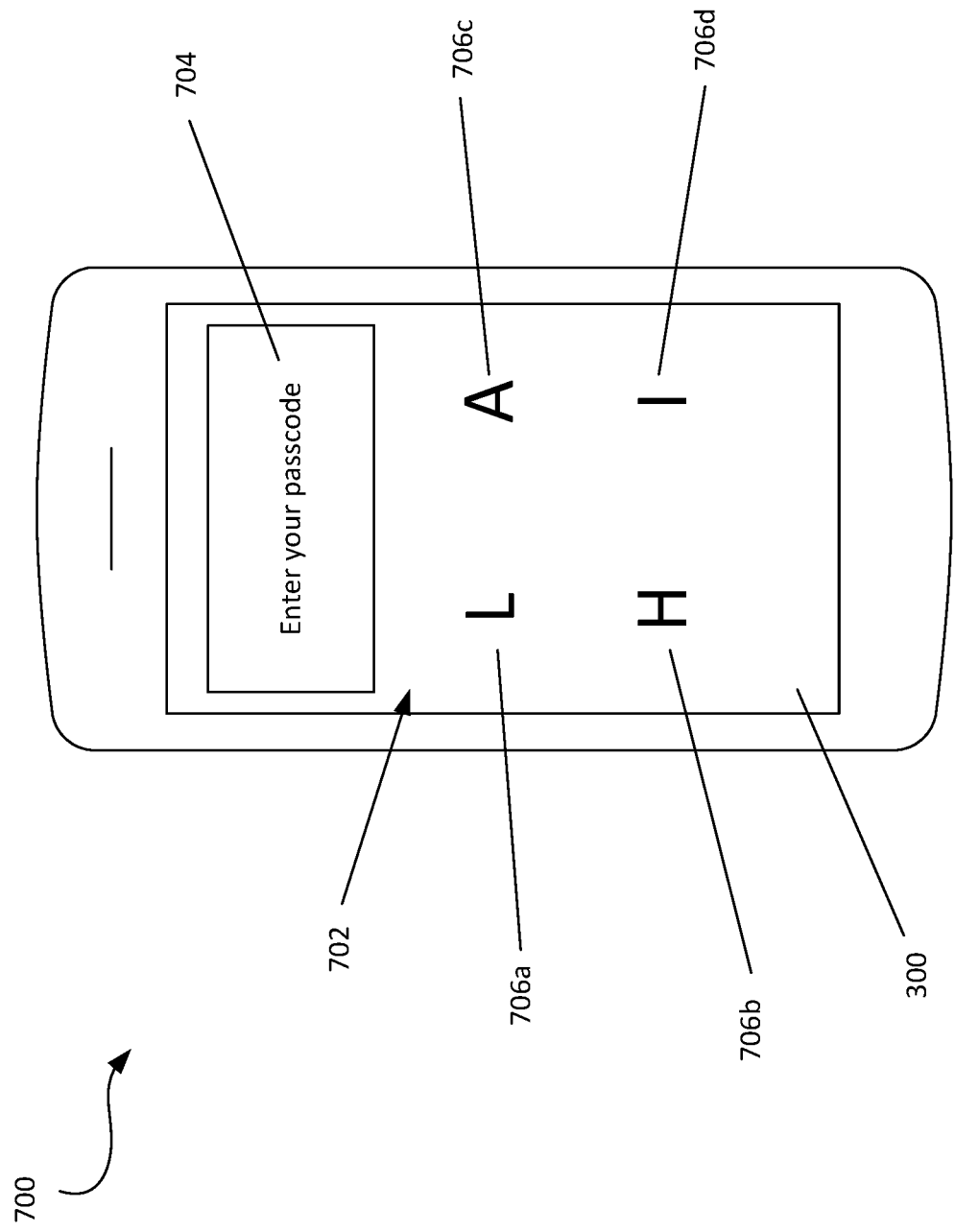
FIG. 7 illustrates another example embodiment of the user interface of the electronic computing device of FIG. 2 with a dynamic keyboard.

FIG. 7 illustrates another example embodiment of the user interface 300 with a dynamic keyboard 702. The user interface 300 includes a message 704 indicating that the electronic computing device 106 needs a passcode to be entered. A dynamic keyboard 702 includes a plurality of alphanumeric characters 706a, 706b, 706c, 706d. One of the plurality of alphanumeric characters 706a, 706b, 706c, 706d is the desired alphanumeric character, while the other plurality of alphanumeric characters 706a, 706b, 706c, 706d are randomly generated. After each input by the user, the displayed alphanumeric characters 706a, 706b, 706c, 706d change. Although four alphanumeric characters are displayed, any number of alphanumeric characters may be displayed on the user interface 300.

Figure 8:
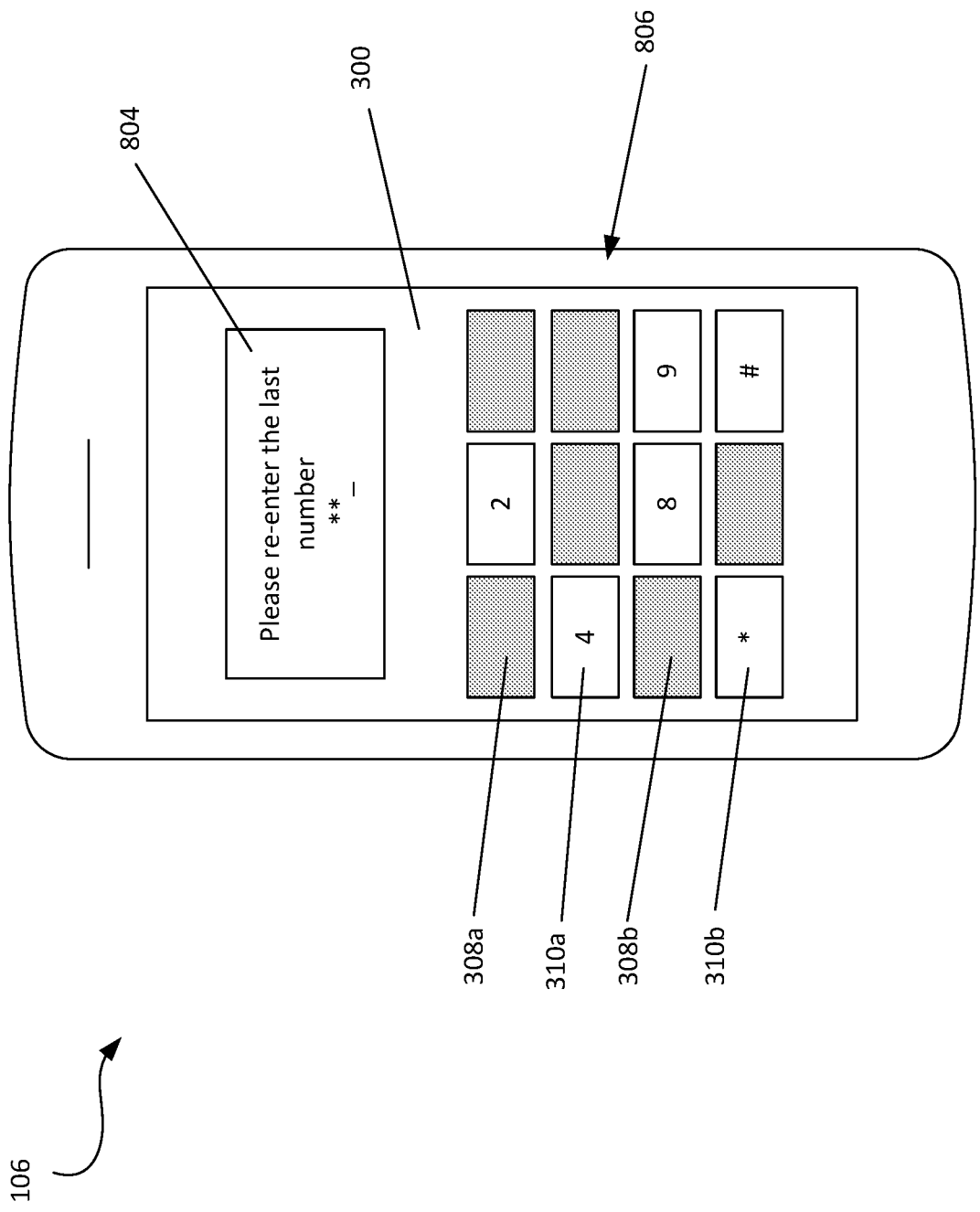
FIG. 8 illustrates another example embodiment of the user interface of the electronic computing device of FIG. 2 with a dynamic keyboard.

FIG. 8 is an example of the user interface 300 with a dynamic keyboard 806 of the electronic computing device 106. In the example shown, a mobile device has already requested a user to enter their passcode in order to unlock the mobile device, but a message 804 indicates that the user needs to re-enter the last number. The dynamic keyboard 806 includes a plurality of standard alphanumeric character keys 310a, 310b and a plurality of greyed-out alphanumeric character keys 308a, 308b. This simplifies passcode entry for a user by only presenting a predetermined number of alphanumeric character keys at a single time.

In a first example, the dynamic keyboard 806 may display the same standard alphanumeric character keys 310a, 310b and the same greyed-out alphanumeric character keys 308a, 308b that were presented when the user entered the previously incorrect number. In another example, the dynamic keyboard 806 may display different standard alphanumeric character keys 310a, 310b and different greyed-out alphanumeric character keys 308a, 308b than were presented when the user entered the previously incorrect number.

Figure 9:
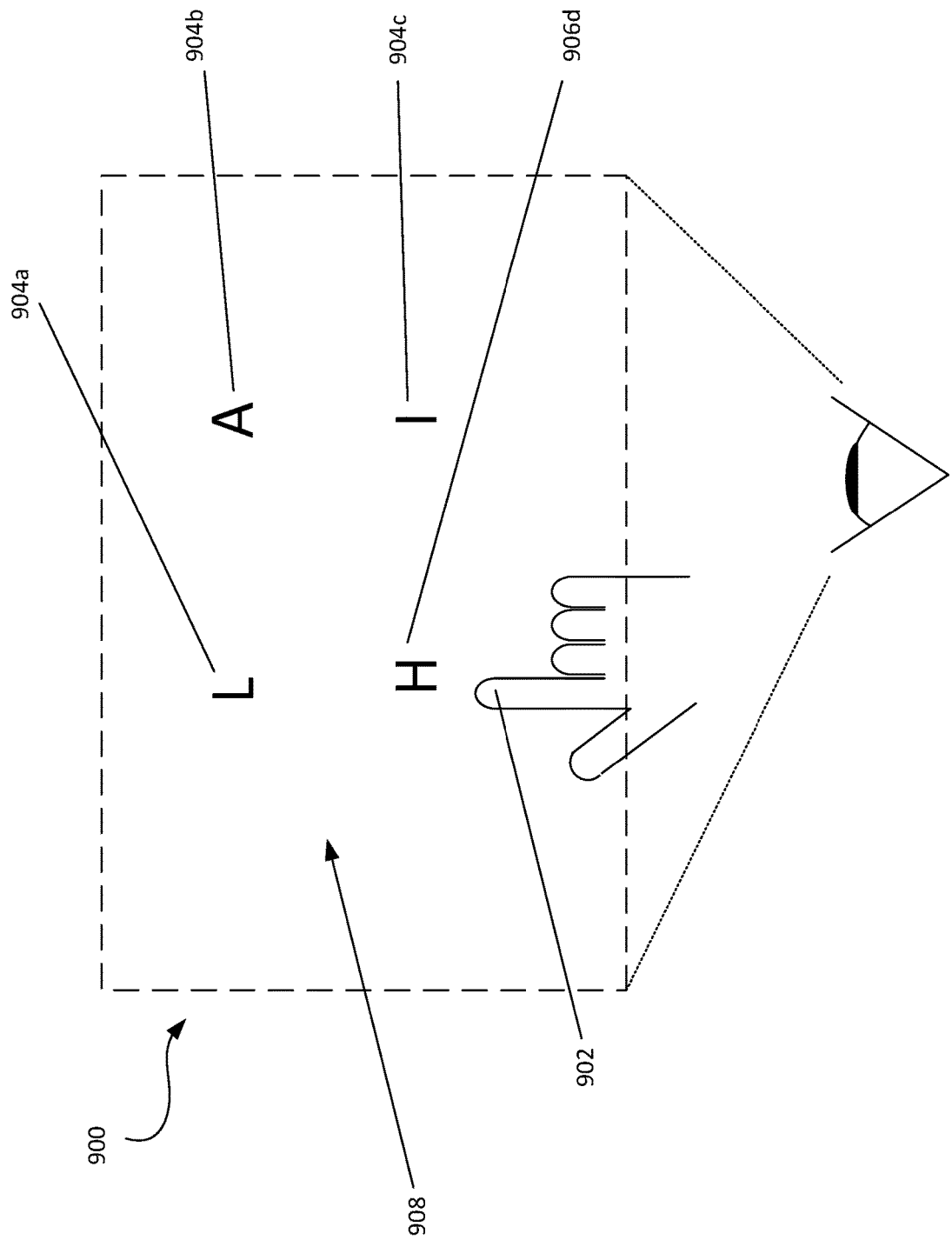
FIG. 9 illustrates another example embodiment of the user interface of the electronic computing device of FIG. 2 with an example holographic image.

FIG. 9 illustrates an example holographic image 900. In the example shown, the holographic image 900 displays a dynamic keyboard 908. The dynamic keyboard 908 as shown includes a plurality of different alphanumeric characters 904a, 904b, 904c, 904d. The user may select 902 the desired alphanumeric character 904a, 904b, 904c, 904d by using a hand gesture.

The dynamic keyboard 908 includes a plurality of alphanumeric characters 904a, 904b, 904c, 904d. One of the plurality of alphanumeric characters 904a, 904b, 904c, 904d is the desired alphanumeric character, while the other plurality of alphanumeric characters 904a, 904b, 904c, 904d are randomly generated. After each input by the user, the displayed alphanumeric characters 904a, 904b, 904c, 904d change. Although four alphanumeric characters are displayed, any number of alphanumeric characters may be displayed on the holographic image 900.

Figure 10:
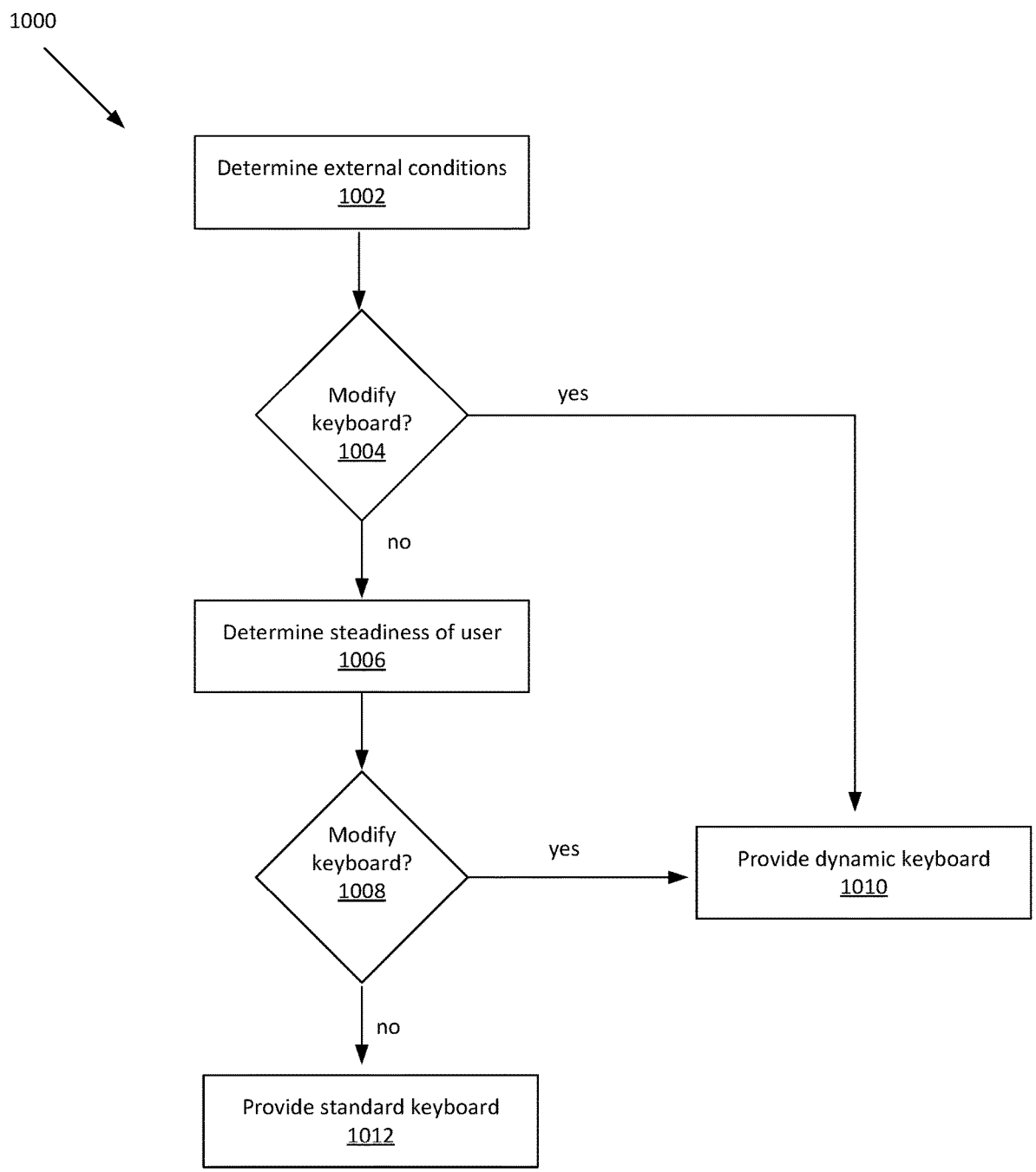
FIG. 10 illustrates an example method for determining when an electronic computing device provides a standard keyboard for a dynamic keyboard.

FIG. 10 illustrates a block diagram of the method 1000 of determining when an electronic computing device provides a standard keyboard or a dynamic keyboard.

At step 1002, the external conditions of the electronic computing device are determined. For example, the electronic computing device receives inputs from a plurality of motion sensors, such as an accelerometer, gyroscope, and magnetometer. The motion sensors are useful to determine how sturdy the electronic computing device is. A tilt, a shake, a rotation, and a swing of the electronic computing device can be used to determine whether a dynamic keyboard should be presented to the user. The readings from the motion sensors can be compared with a predetermined threshold.

At step 1004, a determination is made as to whether or not to modify the keyboard based on the motion sensors. When it is determined that the motion reading is below the predetermined threshold value, a dynamic keyboard is not displayed and the method moves to step 1006. When it is determined that the motion reading is at or above the predetermined threshold value, a dynamic keyboard is displayed and the method moves to step 1010.

At step 1006, the steadiness of the user is determined. The steadiness of the user can be determined based on a reading from a haptic sensor. The readings from the haptic sensor can be compared with a predetermined threshold.

At step 1008, a determination is made as to whether or not to modify the keyboard based on the haptic sensor. When it is determined that the haptic sensor reading is below the predetermined threshold value, a dynamic keyboard is not displayed and the method moves to step 1012. When it is determined that the haptic sensor reading is at or above the predetermined threshold value, a dynamic keyboard is displayed and the method moves to step 1010.

At step 1012, a standard keyboard is provided to the user.

Figure 11:
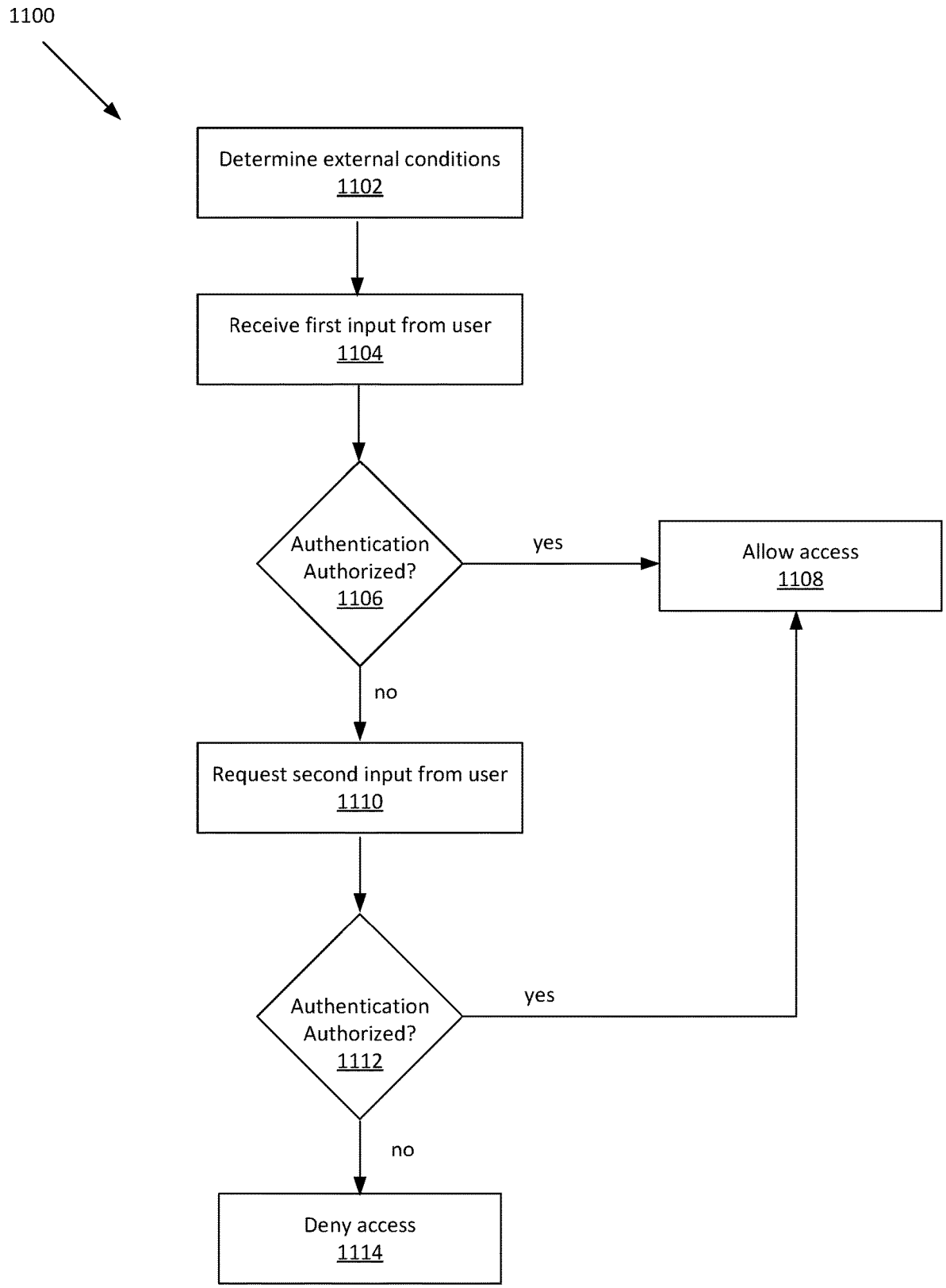
FIG. 11 illustrates an example method for determining when a user is authenticated.

FIG. 11 illustrates a method 1100 of determining when a user is authorized. At step 1102, the external conditions of the electronic computing device are determined. For example, the electronic computing device receives inputs from a plurality of motion sensors, such as an accelerometer, gyroscope, and magnetometer. The motion sensors are useful to determine how sturdy the electronic computing device is. A tilt, a shake, a rotation, and a swing of the electronic computing device can be used to determine whether a dynamic keyboard should be presented to the user. The readings from the motion sensors can be compared with a predetermined threshold. Determining the external conditions can also include determining the steadiness of the user. The steadiness of the user can be determined based on a reading from a haptic sensor. The readings from the haptic sensor can also be compared with a predetermined threshold.

At step 1104, a first input is received from a user. A first input is a selection of an alphanumeric character on an electronic computing device.

At step 1106, it is determined whether the user authentication is authorized. When a user inputs a correct passcode, then the method moves to step 1108, where the user is allowed access to the device (or other application). If the user does not enter the correct passcode, the method moves to step 1110.

At step 1110, a second input from the user is requested. A second input may include requesting the user enter the last entered entry of their passcode, or a request that the user enter the entire passcode again.

At step 1112, it is determined whether the user authentication is authorized. When a user inputs a correct passcode, then the method moves to step 1108, where the user is allowed access to the device (or other application). If the user does not enter the correct passcode, the method moves to step 1114, where the user is denied access to the device (or other application).

Figure 12:
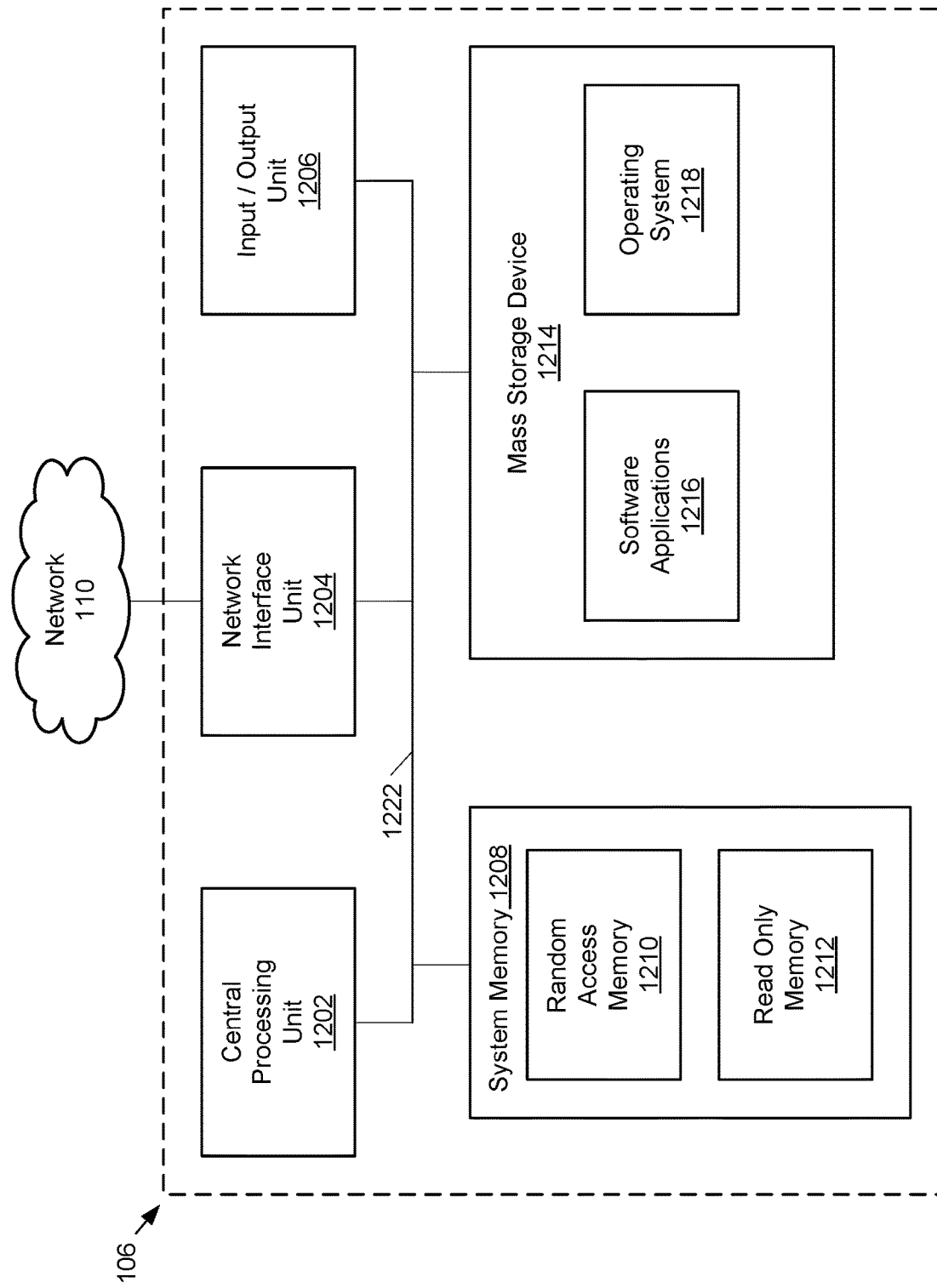
FIG. 12 illustrates an example block diagram of the electronic computing device of FIG. 2.

As illustrated in the example of FIG. 12, the example electronic computing device 106 includes at least one central processing unit ("CPU") 1202, also referred to as a processor, a system memory 1208, and a system bus 1222 that couples the system memory 1208 to the CPU 1202. The system memory 1208 includes a random access memory ("RAM") 1210 and a read-only memory ("ROM") 1212. A basic input/output system that contains the basic routines that help to transfer information between elements within the electronic computing device 106, such as during startup, is stored in the ROM 1212. The electronic computing device 106 further includes a mass storage device 1214. The mass storage device 1214 is able to store software instructions and data. Some or all of the components of the electronic computing device 106 can also be included in the server computer 104 and any other computing devices described herein.

The mass storage device 1214 is connected to the CPU 1202 through a mass storage controller (not shown) connected to the system bus 1222. The mass storage device 1214 and its associated computer-readable data storage media provide non-volatile, non-transitory storage for the electronic computing device 106. Although the description of computer-readable data storage media contained herein refers to a mass storage device, such as a hard disk or solid state disk, it should be appreciated by those skilled in the art that computer-readable data storage media can be any available non-transitory, physical device or article of manufacture.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the electronic computing device 106.

According to various embodiments of the invention, the electronic computing device 106 may operate in a networked environment using logical connections to remote network devices through the network 110, such as a wireless network, the Internet, or another type of network. The electronic computing device 106 may connect to the network 1220 through a network interface unit 1204 connected to the system bus 1222. It should be appreciated that the network interface unit 1204 may also be utilized to connect to other types of networks and remote computing systems. The electronic computing device 106 also includes an input/output controller 1206 for receiving and processing input from a number of other devices, including a touch user interface display screen, or another type of input device. Similarly, the input/output controller 1206 may provide output to a touch user interface display screen or other type of output device.

As mentioned briefly above, the mass storage device 1214 and the RAM 1210 of the electronic computing device 106 can store software instructions and data. The software instructions include an operating system 1218 suitable for controlling the operation of the electronic computing device 106. The mass storage device 1214 and/or the RAM 1210 also store software instructions and software applications 1216, that when executed by the CPU 1202, cause the electronic computing device 106 to provide the functionality of the electronic computing device 106 discussed in this document. For example, the mass storage device 1214 and/or the RAM 1210 can store software instructions that, when executed by the CPU 1202, cause the electronic computing device 106 to display received data on the display screen of the electronic computing device 106.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method for authenticating a passcode on an electronic computing device under unstable conditions, the method comprising:

receiving a motion sensor reading, from at least one of an accelerometer, gyroscope, and magnetometer, to assess a stability of the electronic computing device based on a detected movement of the electronic computing device;

comparing the motion sensor reading to a determined threshold to evaluate the stability of the electronic computing device;

presenting a dynamic keyboard on a user interface, wherein the dynamic keyboard is presented when the motion sensor reading meets or exceeds the determined threshold;

receiving a user input on the user interface, wherein the user input includes selecting at least one alphanumeric character of the passcode on the dynamic keyboard;

utilizing a camera to gather user eye gaze data to validate an intentionality of the user input; and authenticating the user input by:
comparing a selected at least one alphanumeric character against a stored passcode, and
analyzing the user eye gaze data to determine when a gaze of a user was directed at the selected at least one alphanumeric character at a time of selection.

2. The method of claim 1, wherein the dynamic keyboard comprises a plurality of selectable alphanumeric keys and incorporates a feature to adjust a responsiveness of the plurality of selectable alphanumeric keys based on a detected level of instability.

3. The method of claim 1, wherein the dynamic keyboard comprises a plurality of selectable alphanumeric keys and at least at least one alphanumeric key that appears larger than other alphanumeric keys.

4. The method of claim 1, wherein the dynamic keyboard comprises at least one disabled alphanumeric key.

5. The method of claim 1, wherein the dynamic keyboard comprises at least one displayed alphanumeric key and a directional input selector allowing the user to select a direction relative to the at least one displayed alphanumeric key of a desired input.

6. The method of claim 1, wherein the dynamic keyboard is configured to display a limited set of alphanumeric characters, not exceeding four, at any given time.

7. The method of claim 1, wherein the dynamic keyboard provides tactile feedback to keyboard interaction.

8. The method of claim 1, wherein the dynamic keyboard includes an adaptive brightness feature that adjusts the dynamic keyboard's display brightness based on ambient light conditions detected by a light sensor of the electronic computing device.

9. The method of claim 1, wherein the electronic computing device has virtual reality (VR) or augmented reality (AR) capabilities, and the user input is a gesture received from the user.

10. The method of claim 1, further including adapting an orientation of the dynamic keyboard in response to a detected orientation of the electronic computing device.

11. An electronic computing device comprising:
at least one processor; and
a system memory, the system memory including instructions, which, when executed by the at least one processor, cause the electronic computing device to:
receive a motion sensor reading from at least one of an accelerometer, gyroscope, or magnetometer, to assess a stability of the electronic computing device based on a detected movement of the electronic computing device;

compare the motion sensor reading to a determined threshold to evaluate the stability of the electronic computing device;

present a dynamic keyboard on a user interface, wherein the dynamic keyboard is presented when the motion sensor reading meets or exceeds the determined threshold;

receive a user input on the user interface, wherein the user input includes selecting at least one alphanumeric character of a passcode on the dynamic keyboard;

utilize a camera to gather user eye gaze data to validate an intentionality of the user input; and authenticate the user input by:
comparing a selected at least one alphanumeric character against a stored passcode, and
analyzing the user eye gaze data to determine when a gaze of a user was directed at the selected at least one alphanumeric character at a time of selection.

12. The electronic computing device of claim 11, wherein the dynamic keyboard comprises a plurality of selectable alphanumeric keys and incorporates a feature to adjust a responsiveness of the plurality of selectable alphanumeric keys based on a detected level of instability.

13. The electronic computing device of claim 11, wherein the dynamic keyboard comprises a plurality of selectable alphanumeric keys and at least at least one alphanumeric key that appears larger than other alphanumeric keys.

14. The electronic computing device of claim 11, wherein the dynamic keyboard comprises at least one disabled alphanumeric key.

15. The electronic computing device of claim 11, wherein the dynamic keyboard comprises at least one displayed alphanumeric key and a directional input selector allowing the user to select a direction relative to the at least one displayed alphanumeric key of a desired input.

16. The electronic computing device of claim 11, wherein the dynamic keyboard is configured to display a limited set of alphanumeric characters, not exceeding four, at any given time.

17. The electronic computing device of claim 11, wherein the dynamic keyboard provides tactile feedback to keyboard interaction.

18. The electronic computing device of claim 11, wherein the dynamic keyboard includes an adaptive brightness feature that adjusts the dynamic keyboard's display brightness based on ambient light conditions detected by a light sensor of the electronic computing device.

19. The electronic computing device of claim 11, wherein the electronic computing device has virtual reality (VR) or augmented reality (AR) capabilities, and the user input is a gesture received from the user.

20. The electronic computing device of claim 11, further including adapting an orientation of the dynamic keyboard in response to a detected orientation of the electronic computing device.

* * * * *

UNITED STATES PATENT AND TRADEMARK OFFICE
CERTIFICATE OF CORRECTION

PATENT NO. : 12,245,041 B2
APPLICATION NO. : 18/411298
DATED : March 4, 2025
INVENTOR(S) : Linn et al.

Page 1 of 1

It is certified that error appears in the above-identified patent and that said Letters Patent is hereby corrected as shown below:

On the Title Page

Page 2, Column 1, Line 13, Item (56) (U.S. PATENT DOCUMENTS): delete "Mlmaz et al." and insert --Yilmaz et al.--

In the Claims

Column 10, Lines 31-32, Claim 3: delete "at least at least" and insert --at least--

Column 11, Line 28, Claim 13: delete "at least at least" and insert --at least--

Signed and Sealed this
Twenty-second Day of April, 2025

Coke Morgan Stewart
*Acting Director of the United States Patent and Trademark Office*